April 13, 1943.　　A. W. McDONALD　　2,316,526
PLASTIC FRAME FOR SCREENS, VENTILATORS, AND WINDOWS
Filed July 26, 1941　　2 Sheets-Sheet 1
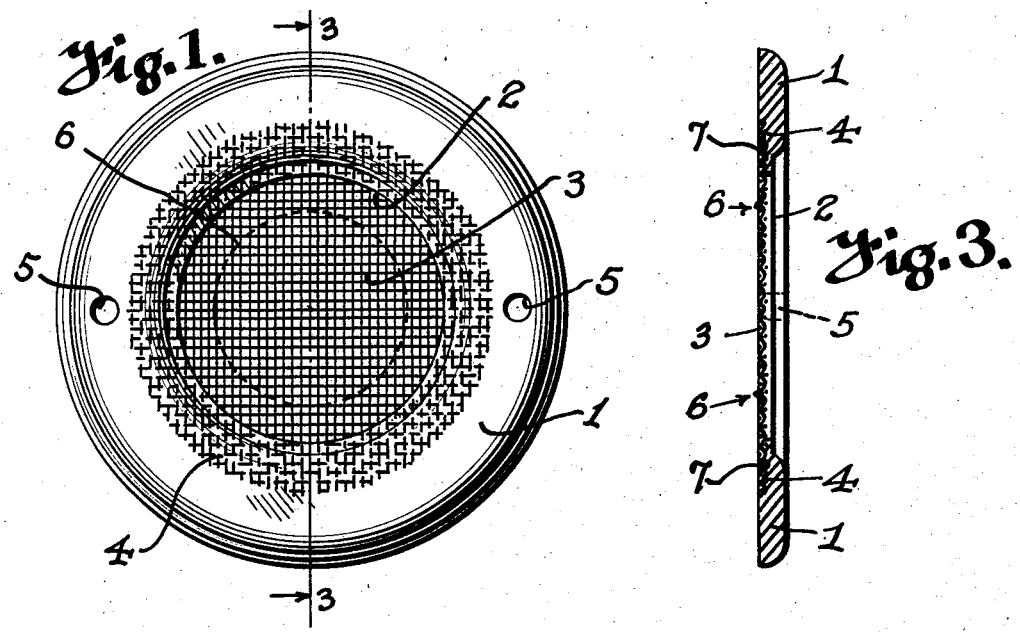
Inventor
A. W. McDonald
By Lester L. Sargent
Attorney April 13, 1943.  A. W. McDONALD  2,316,526
PLASTIC FRAME FOR SCREENS, VENTILATORS, AND WINDOWS
Filed July 26, 1941   2 Sheets-Sheet 2
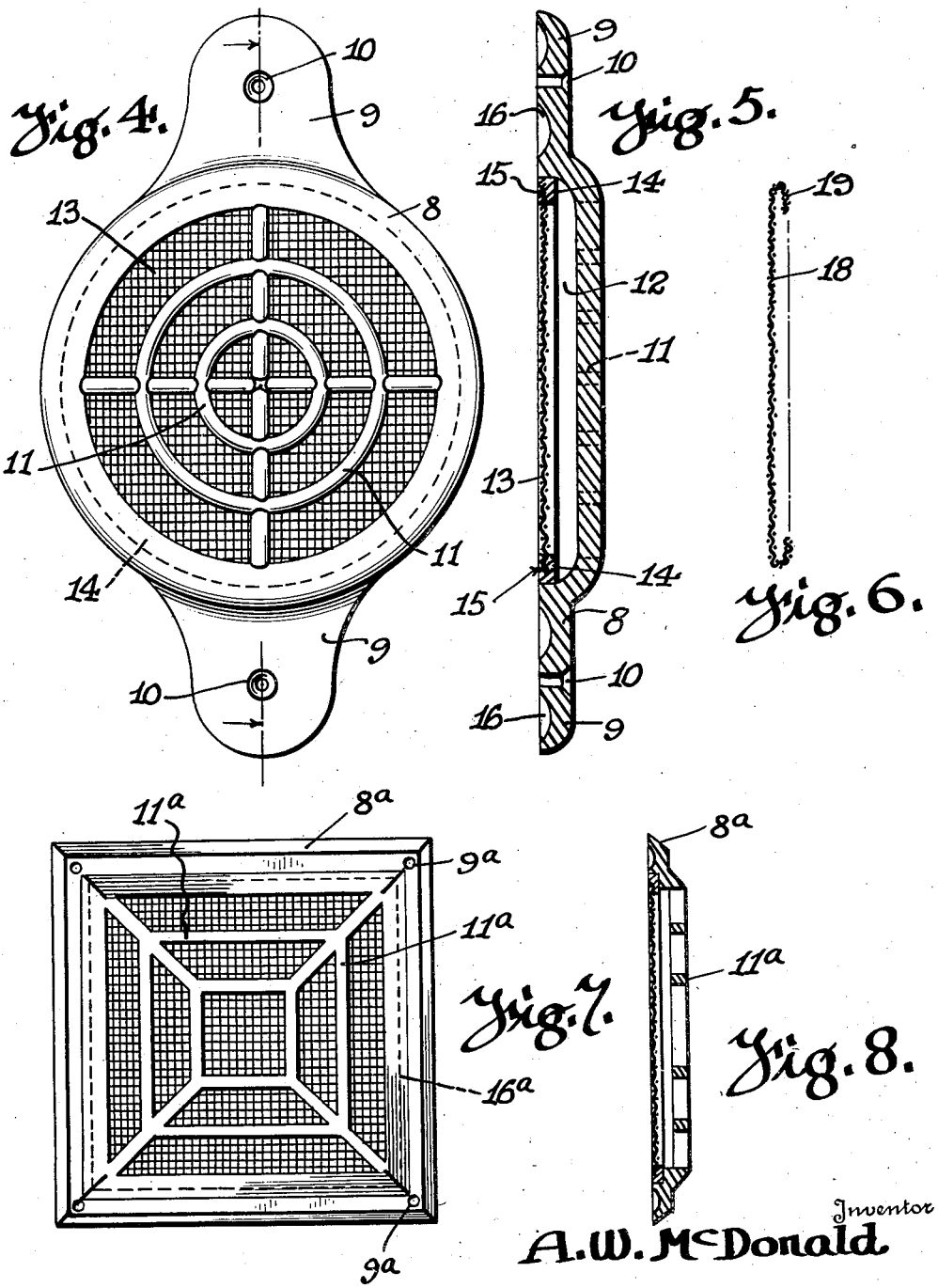

Patented Apr. 13, 1943

2,316,526

UNITED STATES PATENT OFFICE 2,316,526

PLASTIC FRAME FOR SCREENS, VENTILATORS, AND WINDOWS

Albert W. McDonald, Elkhart, Ind.

Application July 26, 1941, Serial No. 404,241

3 Claims. (Cl. 160—382)

The object of my invention is to provide a novel plastic frame for screens, ventilators and windows having the entire frame made of plastic material, whereby to eliminate the necessity of using any metal; and also to provide a frame that is of lighter weight than metal and which is attractive in appearance, insect proof and inexpensive to manufacture.

It is also an object to provide a plastic sash for screens and ventilators to use at the top and bottom of closets and around ice refrigerators in house trailers, and elsewhere where ventilation is required, and to provide suitable areas for ventilating properly.

I attain these and other objects of my invention by the device illustrated in the accompanying drawings, in which—

Figure 1 is a front plan view of the ventilator;

Fig. 2 is a rear plan view of same;

Fig. 3 is a section on line 3—3 of Fig. 1;

Fig. 4 is a front plan view of an improved plastic frame for ventilators having an ornamental face design molded integral with the plastic frame;

Fig. 5 is a section on line 5—5 of Fig. 4;

Fig. 6 is an edge view of a modified form of the wire screen 18 without the frame;

Fig. 7 is a front plan view of another form of plastic frame with the ornamental face design moulded integral with the frame and designed for use especially where a series of aligned ventilators are desired to give increased ventilation area;

Fig. 8 is a substantially central vertical section of Fig. 7.

Like numerals designate like parts in each of the several views.

Referring to the drawings, I provide a ventilator having a frame 1 moulded in the desired shape from a suitable plastic, and having an opening 2 across which a wire screen 3 extends. The edge portion 4 of the screen is embedded in the plastic. The frame has suitable apertures moulded in the frame for the insertion of screws or other fastening elements.

The wire screen preferably is pressed to provide an annular or other ridge 6 spaced an even distance from the edge of the opening of the frame. An annular groove 7 is moulded in the back of the frame, wherein the edge portion of the screen is pressed integrally into the plastic material of the groove bottom to more securely mount it in the plastic.

The frame is compression moulded from a suitable plastic such as phenolic plastic.

Referring to Figs. 4 and 5 which illustrate an improved form of my invention, I provide a plastic frame 8 having opposite ears or extensions 9 in which the screw holes 10 are positioned. The frame 8 is provided with ornamental configurations 11 extending across its face and formed of plastic material integral with the frame 8. The frame also has a depression 12 in its central portion to receive the screen 13. Screen 13 may be mounted with its edges embedded in the plastic screen frame 14. This plastic screen frame is formed with an annular or encircling depression 15 formed in the process of moulding, whereby the edge portion of the screen is pressed or further embedded in the plastic frame of the screen. The screen is also provided with annular or encircling recesses 16 formed in the process of moulding and whereby the minimum amount of material is used in making the frame. The screen is formed with an annular or encircling ridge 6, which takes up slack in the screen resulting from expansion during the process of moulding.

As an alternative to the form of screen in which the screen wire is moulded in the plastic, I may provide a screen 18 having its edge portion 19 bent over on the body of the screen to reenforce same as shown in Fig. 6. Either screen 13 or screen 18 may be inserted in the depressed portion 12 of the outer frame and secured there either frictionally or by means of a suitable adhesive.

Referring to Figs. 7 and 8, there is illustrated a modification of the invention intended for use where a series of ventilators are desired and where a larger area of ventilation is needed. In this form of the invention, I provide a screen frame 8a with apertures 9a to receive screws and having plastic ribs or ornamental strips 11a integral with the frame and extending across its face. This frame also has recesses 16a, whereby to provide a lighter weight frame and save material. Except as to its shape and the design of its ornamental configuration and the provision of larger ventilation area for a given size screen, it is similar to what has been shown and described in connection with Figs. 4 and 5.

What I claim is:

1. In a ventilator of the type described, the combination of a frame moulded from plastic material, a wire screen extending across the opening of the frame and having the edge portions of the wire screen embedded in the plastic frame, the wire screen having a ridge pressed in it at a predetermined distance from the frame to stiffen the screen and take up slack in the screen.

2. In a ventilator of the type described, the combination of a frame moulded from plastic material, a wire screen extending across the opening of the frame and having the edge portions of the wire screen embedded in the plastic frame at the back thereof, and a groove formed in the back of the plastic frame, whereby the edge portions of the wire screen may be pressed deeper into the plastic material of the frame.

3. In a ventilator of the type described, the combination of a plastic frame having ornamental grill-work integral with the frame and extending over the opening of the frame, and having an encircling recessed portion formed in the back of the frame to receive a wire screen, said wire screen being frictionally held in the back of the frame.

ALBERT W. McDONALD.